March 17, 1942.  F. B. JOHNSON  2,276,656

LIGHTNING ARRESTER MATERIAL AND METHOD OF SELECTING THE SAME

Filed Jan. 26, 1940

WITNESSES:
E. F. Oberheim
Fred C. Millham

INVENTOR
Frederick B. Johnson.
By O. B. Buchanan
Attorney

Patented Mar. 17, 1942

2,276,656

UNITED STATES PATENT OFFICE 2,276,656

LIGHTNING-ARRESTER MATERIAL AND METHOD OF SELECTING THE SAME

Frederick B. Johnson, Murrysville, Pa., assignor to Westinghouse Electric & Manufacturing Company, East Pittsburgh, Pa., a corporation of Pennsylvania Application January 26, 1940, Serial No. 315,704

14 Claims. (Cl. 201—72)

My present invention relates to granular materials for use as the basic material for lightning-arrester valve-elements, and also to a new and exacting method for selecting such material and for distinguishing the good from the bad, out of a large number of batches of available material. My invention has more particular relation to silicon-carbide crystals, although it is also applicable to other carbide crystals, notably boron-carbide crystals, and in its still broader aspects it is generally applicable to any granular material, particularly in the size-ranges between 40-mesh and 200-mesh.

The principal part of the experimental and development work connected with my present invention has been done with silicon-carbide crystals which have long been utilized, in one form or another, in making the valve-elements of lightning-arresters, or the active parts of the lightning-arresters (as distinguished from the series-gap elements), where the heavy discharge-currents are substantially cut off, or reduced to a very low value, after the dissipation of an excess-voltage discharge, and before the applied voltage has been reduced to a value as low as the normal rated line-voltage of the arrester. Such lightning-arrester valve-elements have been utilized, heretofore, both in the loose crystal form and in the form of a molded block in which a binding material has been incorporated, to hold the crystals together.

It has long been customary for lightning-arrester manufacturers to utilize the so-called black variety of silicon-carbide crystals, as distinguished from the green variety which is almost pure silicon carbide. Usually the surfaces of the crystals have been subjected, by the silicon-carbide manufacturer, to a thorough cleaning before incorporating them in the lightning-arrester valve-element. It has been known that the commercial black silicon carbide has a higher percentage of impurities, distributed throughout the body of the crystals, than the green variety, and it was assumed that these impurities gave the crystals a somewhat better electrical conductivity, or lower resistance, which rendered them more desirable for use in lightning-arresters. In past years, it has commonly been supposed, also, that all ordinary black silicon carbide was usable as lightning-arrester material, and for a long time, silicon carbide was so ordered, simply as "black" silicon carbide, from the various manufacturers of this product.

Recently, or prior to the series of intensive investigations which have resulted in the present invention, the black silicon carbide which was obtained from silicon-carbide manufacturers has begun to have poor electrical characteristics, specifically having too high a resistance, and as time went on, the silicon-carbide material seemed to go from bad to worse, until it was becoming practically impossible to obtain material which was really satisfactory for use in lightning-arresters. I understand that only a very small part of all of the silicon carbide manufactured in this country, probably much less than 5%, is utilized by the electrical industry as lightning-arrester material, the remainder being manufactured and sold for other uses, principally as abrasive materials of various kinds. In some way, in carrying out their various processes of manufacturing silicon carbide in electrical furnaces, the manufacturers of this material have, perhaps more or less unconsciously, introduced slight changes; or possibly their raw materials may have become obtainable in higher purities than previously. Silicon carbide was still being prepared, in a black variety which looked very much like the old variety, but it had too much electrical resistance, so that its discharge-voltage, when passing heavy surge-currents, was too high, and it lacked the ability to withstand the discharge of surges of long duration without deterioration of the valve-element.

As a consequence of this situation, and in order that the manufacture of successful silicon-carbide lightning-arresters might continue, it became necessary to undertake an exhaustive series of experiments, in which helpful cooperation was obtained from silicon-carbide manufacturers, resulting not only in the re-discovery of a product comparable to the old black variety, which had evidently become a lost art, but in the discovery of a new product, which was better than anything which was definitely known before, or at least better than any old product which could be distinguished from any other old product; and further resulting in the development of a new and exacting test-procedure as a means for selecting those batches of granular material or crystals which are the best adapted for lightning-arresters.

These investigations have included exhaustive chemical analyses, carried out to the greatest refinement possible, and involving quantities of impurities, oftentimes as low as .02 of 1%, such as would commonly be reported merely as traces. Concomitant with these chemical analyses covering many different samples or kinds of silicon carbide, exhaustive electrical tests were made, to determine the electrical characteristics and the actual lightning-arrester performance, of each of the analyzed samples. Consideration was given to surface-impurities as well as body-impurities within the silicon-carbide crystals. It was found that, while surface-impurities or conditions certainly have an effect upon lightning-arrester performance, the basic difficulty, with the materials then commercially available, resided in the high resistivity, or poor electrical conductivity, of the body-portion of the crystals, these crystals belonging to the classification of semi-conductors. It was also observed that those crystals which have the highest percentage of body-impurities had the lowest electrical resistance and were otherwise the best suited for lightning-arrester use. The principal one of the impurities which were commonly present, so far as lightning-arrester performance was concerned, seemed to be aluminum.

As a result of these developments, I have discovered, and perfected, a relatively simple, practical, electrical test which could be applied to the different batches of black silicon carbide, as received from the silicon-carbide manufacturer, as a basis for accepting some batches, and rejecting other batches as unsuitable for electrical use in the manufacture of lightning-arrester valve-elements. In brief, I have discovered that a simple measurement of the resistance of the material will suffice to discriminate between the acceptable and unacceptable material, by the simple process of picking out the low-resistance material. While I believe that any suitable method of measuring this resistance will be beneficial, I have worked out a special test-procedure which utilizes a discharge of a predetermined, arbitrarily fixed magnitude, and measuring the voltage-drop across a body of crystals carrying such a discharge.

Two methods of obtaining silicon carbide of sufficient impurity-content and resultant body-conductivity were found. The first method consists of selecting, from the silicon-carbide crude, or cake, as it comes from the furnace, that portion of the crystals which naturally contains the most impurities, and processing them separately from the remainder of the crude, in order to obtain grains for lightning-arrester use. The second method consists of introducing the required impurities into the crystals during the process of manufacture of the material.

In the manufacture of silicon-carbide crystals, a furnace-charge, mainly consisting of fine white sand or silica, and coke, is mixed together, and heated in an electrical furnace which initially has a core of carbon or graphite for starting the current-flow. This charge is heated, by the flow of electricity, to very high temperatures such that even the firebrick which lines the furnace has to be protected by a coating of a still more refractory substance, called fire sand, which is in reality a by-product of previous silicon-carbide charges, this fire sand probably being an impure variety of silicon carbide. After a heating period of several hours' duration, and a cooling period of several days' duration, the charge is removed from the furnace, in the form of a large cake or solid mass, from the surfaces of which the fire sand must first be removed, after which the mass is crushed or pulverized in special crushing-machines.

It is known that the appearance of the cake or mass is different, at different portions of its cross-section, the inside crystals being fairly large, usually highly colored, and relatively hard to break, whereas the outside of the cake, where it joined the fire sand, usually consists of smaller crystals which are not so highly colored, although possibly of a greater impurity-content, and relatively easy to crush into small particles. A study was made, of crystals taken from the inside and from the outside of the cake. Each sample was broken down, into particles of the size-range commonly used in lightning arresters, cleaned, and tested for electrical resistance, using the method hereinafter described. It was found that the sample taken from the outside of the cake had considerably more conductivity than that representing the material produced at the inside of the cake. This suggested that, if the crude silicon carbide from the outside of the cake could be separated from that on the inside, and processed separately, it would probably be more suitable for lightning-arrester use. As a general rule, however, the manufacturers of finely divided silicon-carbide crystals prefer not to attempt to discriminate between the crystals which come from near the outside of the cake and those which come from near the inside, because of practical reasons of economy.

When black silicon carbide is being manufactured, it is sometimes necessary, in an occasional charge of the furnace, to add a small quantity of alumina to the charge, in order to cause the resulting crystals to be black throughout the body of the crystals, after the surface-impurities have been more or less removed by the cleaning-methods developed by the various manufacturers of silicon carbide.

As a result of my exhaustive series of investigations, I have persuaded two different manufacturers of silicon-carbide crystals to add abnormally high quantities of alumina to the charging-mixes of special furnace-charges which were fired for the purpose of obtaining crystals in the size-ranges which are required for lightning-arrester work, so as to have an abnormally high percentage of body-impurities, particularly aluminum, which I have found to be necessary to be present in an amount at least equal to 0.28%. The resulting product was found to have greater body-conductivity, and to be more useful for the manufacture of lightning-arrester valve-elements, than any other silicon-carbide grain previously used or tested, including the special sample, previously described, which was prepared from the material at the outside surface of the cake of crude silicon carbide, manufactured according to the manufacturers' standard procedure.

This impurity-adding procedure is somewhat disadvantageous, from the standpoint of the silicon-carbide manufacturer, because there is a tendency for the impurities to accumulate in the fire sand to such an extent that it becomes difficult to use this fire sand over again in the normal production-procedure, in firing subsequent furnace-charges. By taking advantage, however, of the relatively small amount of the total silicon-carbide output which is required for electrical purposes in the manufacture of lightning-arresters, it is possible to only occassionally utilize furnace-charges having these excessive admixtures of impurities (notably alumina), at other times running through the furnace-charges without these additional impurities, so that the fire sand does not become progressively contaminated. In other words, while it seems to be somewhat impractical, at the present price-ranges, to manufacture black silicon-carbide crystals which are always of the electrical characteristics required for the manufacture of the best lightning-arrester valve-elements, a way has been worked out, with the aid of occasional impurity-rich furnace-charges, and with the aid of a new and exacting electrical test-method, for selective purposes, to obtain a relatively small amount of black silicon carbide which is not only as good, electrically, as the old variety which used to be obtainable, but which is, in general, quite noticeably better, in electrical performance, than any black silicon-carbide crystals which were ever known before, certainly better than any such material which could previously have been segregated from the usual run of black silicon-carbide material which was previously known.

The valve-element of a lightning-arrester is usually a compromise between conflicting requirements. It is desirable that it shall have a reasonably short length or height, for any given voltage-rating, and that it should have a reasonably low protective ratio, that is, the ratio between the crest discharge-voltage, when the element is discharging heavy surge-currents, and either the rated line-voltage or the (somewhat higher) "cut-off" voltage, or voltage at which the valve-element causes the discharge-currents to be reduced to a relatively small value which can be interrupted by the series-gap elements which are usually provided as a part of the arrester. It is further desirable, as more recently discovered, that the arrester valve-element should have a reasonably long life, or the ability to withstand a reasonably large number of surge-discharges, when subjected to surges of long duration, as well as when subjected to brief surges of high intensity.

My present invention is an improvement over the subject matter of a copending application of Leon R. Ludwig and myself, Serial No. 321,458, filed February 29, 1940, for Lightning arresters, in which were disclosed some of the fundamental characteristics of silicon carbide when used as the basic material, or the active element, in the valve-element of a lightning-arrester. This copending application particularly described and claimed the filling of the pores or spaces between the regular-sized crystals or granules which made up the main portion of the valve-element, with much more finely divided particulate matter, either in the form of loose powdered material, or in the form of a binding material, preferably ceramic which bound the crystals together in a solid, the quantity of pore-filling material being approximately equal to the quantity necessary to fill said pores without separating the coarser crystals out of crystal-to-crystal contact with each other.

It is an object of my present invention to improve upon the arresters described in the copending application just mentioned, by an improvement in the grain-material which is utilized for the coarser aggregates or crystals which constitute the basic material, or active element, of the lightning-arrester valve-element. I have discovered that the utilization of improved body-material for the grains or crystals has a marked advantage in increasing the life of the arrester, both when subjected to very severe surges of high current-magnitude, but brief duration, and the still severer surges of long duration, even though of moderate, or even small, surge-current intensity.

A more general object of my invention is to provide a novel selective test-method, and the selected product obtainable thereby, which is broadly applicable to the manufacture of lightning-arrester valve-elements from granular material of any composition, not necessarily silicon carbide, particularly in the grain-sizes ranging from 40-mesh to 200-mesh.

A still further object of my invention relates to the provision of electrically satisfactory crystals of any sort of semi-conducting crystalline carbide, and specifically boron carbide.

With the foregoing and other objects in view, my invention consists in the structures, compositions, combinations and methods hereinafter described and claimed, and illustrated in the accompanying drawing wherein:

Figure 1:
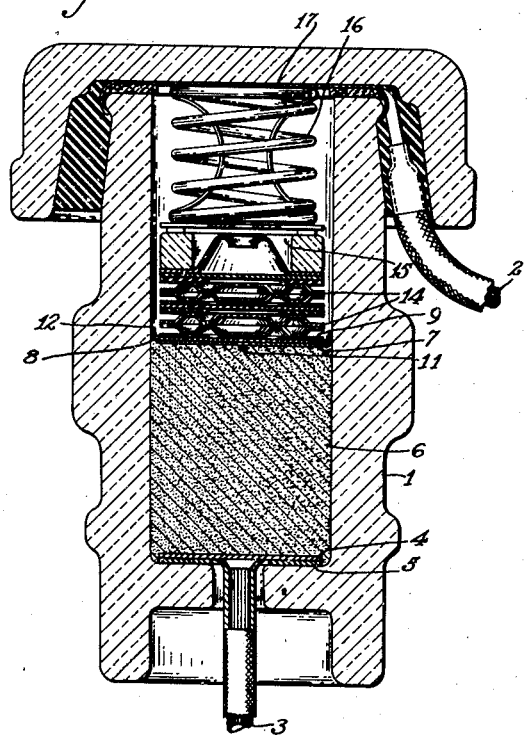
Figure 1 is a vertical sectional view of a lightning-arrester embodying my invention in a loose-grain form.

In Fig. 1, I show a practical form of embodiment of my invention, in a lightning-arrester utilizing a porcelain housing 1 having a line-terminal 2 entering at the top, and a ground-terminal 3 at the bottom. The porcelain housing 1 is hollow, containing, at its lower end, a terminal-electrode 4 which is properly sealed, to the bottom of the housing, by a sealing-gasket 5. Disposed over this bottom terminal-electrode 4 is a loose mass consisting of a large number of silicon-carbide crystals 6, pressed down, at the top, by a terminal-electrode or contact-plate 7. In the particular embodiment illustrated, the contact-plate 7 is surmounted by a thin metal disc 8, the edges of which are spun in place against the bore of the porcelain housing 1, this thin metal disc 8 being strengthened or stiffened by a backing-up plate 9. The two plates 7 and 9, with the spun-metal disc 8 between them, are preferably riveted together, as indicated at 11. Immediately above the spun-metal disc 8, the space near the bore of the porcelain housing 1 is further cemented by a gum seal 12 for preventing leakage of the fine silicon-carbide dust during shipment, when the arrester may be turned upside down.

Surmounting the valve-element part of the arrester, which is made up by the terminal plate-structures 4 and 7, and the intervening mass of loose carbide crystals 6, I have shown my arrester as comprising a quench-gap portion 14, which is, in turn, surmounted by a spark-gap or switching gap structure 15, which is, in turn, surmounted by a spring 16 which holds the various parts together under pressure, said spring bearing up against a line-terminal electrode 17 at the top of the casing.

As explained in the above-mentioned copending application, the mass of loose silicon-carbide crystals 6 which constitute the valve-element of the arrester, is made up of a mixture which is composed, for the most part, of crystals of a certain mesh-rating, together with an admixture of other crystals of preferably (though not necessarily) at least three times as large a mesh-number. The relative proportions of the coarse and fine crystals are such as, by calculation or experiment, have been found to be requisite, so that the fine material is present in about the right amount, or approximately nearly the right amount, to fill the spaces or voids between the larger crystals.

While I am not limited to any particular size of the relatively coarse silicon-carbide particles, there are advantages, not unmixed with certain disadvantages, in utilizing as large a size of the "coarse" particles as possible, and specifically one of the three sizes which are known, respectively, as 60-mesh, 80-mesh, or 100-mesh, although I might also use either 40-mesh or 120-mesh crystals.

When I refer to material of different screen-sizes, such as 80-mesh, for example, I refer to material which conforms to the Bureau of Standards specifications for abrasive materials of that size, or any similar standard of measurement, it being understood that a certain small admixture of both finer and coarser particles is tolerated in the definition of particles of a certain screen-mesh size or number.

Various relative amounts of the fine-mesh silicon-carbide crystals, as compared with the volume of the large-mesh silicon-carbide crystals, may be utilized. While I am not limited to any exact ratios, or to any admixture of fine material at all, with the granular structure which constitutes the main part of my crystals 6, it may be noted that successful results have been obtained with 100 parts of 40-mesh silicon-carbide crystals and 30 parts, by volume, of 325-mesh silicon-carbide crystals; or with 100 parts of 60-mesh silicon-carbide crystals and 25 parts, by volume, of 325-mesh silicon-carbide crystals. With 100 parts of 100-mesh silicon-carbide crystals I have also tried an admixture of 20 parts, by volume, of 325-mesh silicon-carbide crystals, with some success, but I believe that better results could have been obtained if I had used much finer fine-mesh crystals, such as, for example, 600-mesh crystals.

As pointed out in the above-mentioned copending application, the fine-mesh material, if it is utilized, should be of a mesh-number at least three times as large as the main or large-sized crystals. The admixture of fine-mesh crystals, in the relative proportions indicated, while not obligatory, tends definitely to give the arrester a longer life, particularly when subjected to discharges of long duration.

In accordance with my present invention, as previously indicated, the silicon-carbide crystals 6, particularly the basic larger crystals, are relatively rich in impurities, particularly aluminum, as compared with the ordinary commercial product. I believe that aluminum should be present in somewhat more than 0.28 percent. The smaller, void-filling particles, if used at all, may be either of the same composition, or any refractory, relatively poorly conducting material.

Figure 4:
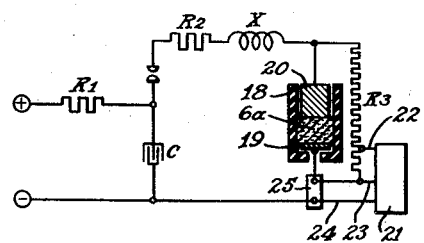
Fig. 4 is a diagrammatic view of circuits and apparatus for making a test in accordance with my invention.

In accordance with my invention, I also select my crystals 6, particularly the larger crystals which make up the main portion, in accordance with a special test, or any equivalent thereof. In the preferred form of my test, as diagrammatically illustrated in Fig. 4, I place some loose crystals 6a, of a given mesh-size, such as 60-mesh, 80-mesh, or the like, in an insulating cylindrical container 18 of approximately 2¼ inches diameter, between a lower electrode 19 and an upper electrode 20, the latter being diagrammatically indicated as a 500-pound weight, to indicate the application of approximately that much pressure, to ensure good crystal-contacts.

The test-sample 6a is then subjected to a predetermined surge having a crest-magnitude of 1500 amperes, from a surge-generator which is diagrammatically represented by a capacitor C. The capacitor C is charged, through a resistor $R_1$, from a direct-current source which is represented by the terminals (+) and (−). The capacitor C is discharged through the test-sample 6a, in series with a resistor $R_2$ and an inductor X which are adjusted to control the wave-shape of the discharge-current, this wave-shape being so adjusted that the surge rises to its crest-value in approximately 10 micro-seconds, and then decays to one-half of the crest-value in approximately 10 additional micro-seconds. The discharge-voltage is then measured, and the test-sample is rated according to its voltage per inch of length, measuring its length as the distance between the two electrodes 19 and 20. The current and voltage are measured by a cathode-ray oscillograph 21, having a voltage-plate circuit 22, 23, which is tapped off of a high-resistance potentiometer $R_3$ shunting the test-sample 6a, and a current-plate circuit 23, 24 which is tapped off of a current-shunt 25.

Figure 3:
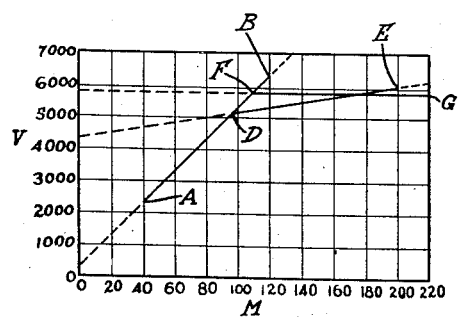
Fig. 3 is a curve-diagram illustrative of the test which I apply to various samples of lightning-arrester materials.

In Fig. 3, the voltage-gradient V, in volts per inch, is plotted against the mesh-number M of the test-sample 6a. Crystals of any given size may be compared with each other, according to their voltage-gradients, but crystals of different mesh-sizes will, in general, have different limiting voltage-gradients, limiting the boundary between acceptable and unacceptable specimens.

In Fig. 3, the straight-line curve A—B, between the limits of 40-mesh and 120-mesh, represents electrical resistivities which are somewhat better (lower) than was heretofore known in even the best old black silicon-carbide crystals, particularly in the preferred sizes of 60-mesh, 80-mesh and 100-mesh. Materials having the voltage-gradients shown in the curve A—B, or somewhat lower (better) gradients, are obtainable both by the admixture of abnormally high amounts of impurities (particularly alumina) with the furnace-charges, as above-described, in conjunction with the selective test-process shown in Fig. 4. The formula for the curve A—B is $V = 200 + 50 M$.

My invention is not limited to crystal-sizes between 40-mesh and 120-mesh, as represented by the curve A—B in Fig. 3. In the size-range between 100-mesh and 200-mesh, a useful criterion (maximum voltage-gradient) for acceptable lightning-arrester samples is that shown by the straight-line curve D—E in Fig. 3, representing the formula $V = 4400 + 8 M$, the point D lying also in the curve A—B.

Another good rule to follow, in testing granular lightning-arrester materials for acceptability, is to set a horizontal voltage-gradient limit of 5700 volts per inch for the finer-sized material, whatever its degree of fineness, as indicated by the curve F—G in Fig. 3, where the point F coincides with the A—B curve at 110-mesh, and where the point G is to be considered as running off the scale to the largest possible mesh-numbers.

While my principal tests have concerned impurity-rich silicon-carbide crystals, I have also tested other materials and I believe that my above-described test-limits are generally applicable, with but slight variations, to all crystalline or granular lightning-arrester material. Specifically, these materials include other crystalline semi-conducting carbides, notably boron-carbide, the latter material being apparently the best adapted for lightning-arrester service in the size-ranges from 120-mesh to 200-mesh.

In operation, when an excess-voltage surge is applied to an arrester as shown in Fig. 1, the series gap-devices 14 and 15 first break down, applying practically the full line-voltage to the valve-type part, consisting of the mass of silicon-carbide (or other) crystals 6, and the surge-current is discharged to ground through these crystals. At the expiration of the surge-discharge, it is believed that the sparks at the crystal-contacts are extinguished, and at any rate the apparent internal resistance of the discharge more or less suddenly increases, at what is known as the "cut-off" voltage of the arrester, so that the discharge-current is reduced to a value at which the final current-interruption is brought about in one or both of the series gap-devices 14 and 15, at a voltage which is only slightly higher than the rated line-voltage of the arrester. Arresters built as I have described are better able to withstand many repeated surges of long duration, without arrester-failure, than has been heretofore possible.

Figure 2:
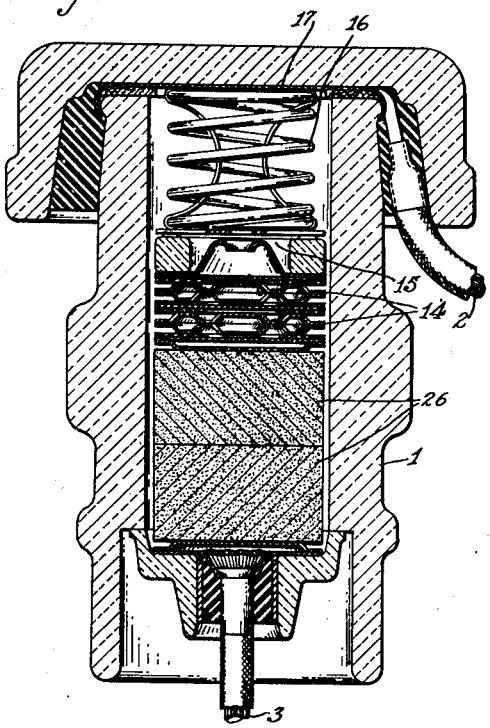
Fig. 2 is a similar view illustrating an embodiment of the invention in a ceramic-block form.

In Fig. 2, I show my invention in a form of embodiment in which, instead of utilizing a mass of loose silicon-carbide (or other) crystals 6, I utilize a block, or a plurality of blocks 26, of molded silicon-carbide (or other) crystals. In molding these blocks, I utilize silicon-carbide crystals corresponding to the relatively coarser crystals which were utilized in the loose mix 6 of Fig. 1, such as 60-mesh, 80-mesh, or 100-mesh silicon-carbide crystals, without being limited, of course, to these particular sizes, as I may utilize either coarser or finer-mesh particles, or mixtures of different meshes. I prefer, however, to have the silicon-carbide crystals of a single mesh-rating, such as 60-mesh, or 80-mesh, and I mix, with these silicon-carbide particles, a certain amount of clay, or other ceramic material, which will operate both as a binder and as a filler to close the pores or voids between the grains of silicon carbide.

As pointed out in the previously mentioned copending application, the clay should be present in quantities not substantially greater than enough to fill these pores or voids. Practically, clay may be present in quantities varying between 30 and 40% of the total weight of the finished molded arrester-block. A proper amount of clay is the largest amount usable without allowing or causing the block to shrink during firing. In the course of manufacture, the silicon carbide and clay are thoroughly mixed together, with the addition of a small amount of water, after which the mixed mass is molded into blocks and fired in a furnace, in accordance with a practice which is well known except for the relatively small quantity of clay which I utilize.

In operation, a lightning-arrester made with molded valve-element blocks 26, as shown in Fig. 2, operates the same as in the case of the loose-crystal arrester of Fig. 1, the electrical conductivity through the block or blocks 26 being through the grains of the silicon carbide, and across the crystal-to-crystal contact points, as in the loose-grain arrester, the clay binder being utilized both as a means for drawing the crystals together in a tightly held mass, and (like the void-filling powder of Fig. 1) as a means for resisting the spread of the arcs or sparks which originate at the crystal-junctions, so that individual crystals are not, in general, entirely enveloped in, and short-circuited by, a spark or highly ionized space.

A second form of the block-type of valve-element, in which I utilize the material of my invention, is one in which the relatively coarser crystals of silicon carbide, as used in the clay-bonded block, are held in close proximity to each other by a bond of sodium silicate or water-glass. In this case, the sodium silicate performs the dual purpose of holding the block together, thus maintaining contact between adjacent crystals, and partially filling the voids between crystals and inhibiting flashover of the crystals during the discharge of surge-currents.

While I have illustrated my invention in two different illustrative forms of embodiment, and while I have explained the preferred limits in the application of my materials, processes and mixtures, I wish it to be understood that I am not altogether limited to these details, as many changes or variations may be adopted by those skilled in the art, without departing from the essential principles of my invention, particularly in the broader aspects thereof. I desire, therefore, that the appended claims shall be accorded the broadest construction consistent with their language and the prior art.

I claim as my invention:

1. A lightning-arrester valve-element comprising, as its basic material, a large number of M-mesh, semi-conducting, substantially contacting particles in the size-range where M is not less than 40, characterized by said particles having electric-discharge characteristics corresponding to a crest-voltage of V volts per inch when a cylindrical column of such particles, loosely packed, under a total pressure of approximately 500 pounds, and with a cylinder-diameter of approximately 2¼ inches, is discharging a surge having a crest-magnitude of 1500 amperes and a wave-shape such as to rise to crest-value in approximately 10 micro-seconds and to decay to one half of the crest-value in approximately 10 additional micro-seconds, where V is less than (200+50 M) in the range from 40-mesh to 110-mesh, and less than 5700 volts when M is larger than 110.

2. A lightning-arrester valve-element comprising, as its basic material, a large number of M-mesh, semi-conducting, substantially contacting particles in the size-range where M is not less than 40 nor larger than 200, characterized by said particles having electric-discharge characteristics corresponding to a crest-voltage of V volts per inch when a cylindrical column of such particles, loosely packed, under a total pressure of approximately 500 pounds, and with a cylinder-diameter of approximately 2¼ inches, is discharging a surge having a crest-magnitude of 1500 amperes and a wave-shape such as to rise to crest-value in approximately 10 micro-seconds and to decay to one half of the crest-value in approximately 10 additional micro-seconds, where V is less than (200+50 M) in the range from 40-mesh to 100-mesh, and less than (4400+8 M) in the range of from 100-mesh to 200-mesh.

3. A lightning-arrester valve-element comprising, as its basic material, a large number of M-mesh, semi-conducting, substantially contacting particles in the size-range where M is not less than 40 nor larger than 120, characterized by said particles having electric-discharge characteristics corresponding to a crest-voltage of V volts per inch when a cylindrical column of such particles, loosely packed, under a total pressure of approximately 500 pounds, and with a cylinder-diameter of approximately 2¼ inches, is discharging a surge having a crest-magnitude of 1500 amperes and a wave-shape such as to rise to crest-value in approximately 10 micro-seconds and to decay to one half of the crest-value in approximately 10 additional micro-seconds, where V is less than (200+50 M).

4. A lightning-arrester valve-element comprising, as its basic material, M-mesh crystals disposed so as to have a large number of crystal-to-crystal point-contacts, where M is not less than 40, characterized by said crystals being of a semi-conducting carbide of such composition that they have electric-discharge characteristics corresponding to a crest-voltage of V volts per inch when a cylindrical column of such crystals, loosely packed, under a total pressure of approximately 500 pounds, and with a cylinder-diameter of approximately 2¼ inches, is discharging a surge having a crest-magnitude of 1500 amperes and a wave-shape such as to rise to crest-value in approximately 10 micro-seconds and to decay to one half of the crest-value in approximately 10 additional micro-seconds, where V is less than (200+50 M) in the range from 40-mesh to 110-mesh, and less than 5700 volts when M is larger than 110.

5. A lightning-arrester valve element comprising, as its basic material, M-mesh crystals disposed so as to have a large number of crystal-to-crystal point-contacts, where M is not less than 40 nor larger than 200, characterized by said crytals being of a semi-conducting carbide of such composition that they have electric-discharge characteristics corresponding to a crest-voltage of V volts per inch when a cylindrical column of such crystals, loosely packed, under a total pressure of approximately 500 pounds, and with a cylinder-diameter of approximately 2¼ inches, is discharging a surge having a crest-magnitude of 1500 amperes and a wave-shape such as to rise to crest-value in approximately 10 micro-seconds and to decay to one half of the crest-value in approximately 10 additional micro-seconds, where V is less than (200+50 M) in the range from 40-mesh to 100-mesh, and less than (4400+8 M) in the range from 100-mesh to 200-mesh.

6. A lightning-arrester valve-element comprising, as its basic material, M-mesh crystals disposed so as to have a large number of crystal-to-crystal point-contacts, where M is not less than 40 nor larger than 120, characterized by said crystals being of a semi-conducting carbide of such composition that they have electric-discharge characteristics corresponding to a crest-voltage of V volts per inch when a cylindrical column of such crystals, loosely packed, under a total pressure of approximately 500 pounds, and with a cylinder-diameter of approximately 2¼ inches, is discharging a surge having a crest-magnitude of 1500 amperes and a wave-shape such as to rise to crest-value in approximately 10 micro-seconds and to decay to one half of the crest-value in approximately 10 additional micro-seconds, where V is less than (200+50 M).

7. A lightning-arrester valve-element comprising, as its basic material, M-mesh crystals disposed so as to have a large number of crystal-to-crystal point-contacts, where M is not less than 40, characterized by said crystals being crystals of silicon carbide having sufficient body-impurities to cause said crystals to have electric-discharge characteristics corresponding to a crest-voltage of V volts per inch when a cylindrical column of such crystals, loosely packed, under a total pressure of approximately 500 pounds, and with a cylinder-diameter of approximately 2¼ inches, is discharging a surge having a crest-magnitude of 1500 amperes and a wave-shape such as to rise to crest-value in approximately 10 micro-seconds and to decay to one half of the crest-value in approximately 10 additional micro-seconds, where V is less than (200+50 M) in the range from 40-mesh to 110-mesh, and less than 5700 volts when M is larger than 110.

8. A lightning-arrester valve-element comprising, as its basic material, M-mesh crystals disposed so as to have a large number of crystal-to-crystal point-contacts, where M is not less than 40 nor larger than 200, characterized by said crystals being crystals of silicon carbide having sufficient body-impurities to cause said crystals to have electric-discharge characteristics corresponding to a crest-voltage of V volts per inch when a cylindrical column of such crystals, loosely packed, under a total pressure of approximately 500 pounds, and with a cylinder-diameter of approximately 2¼ inches, is discharging a surge having a crest-magnitude of 1500 amperes and a wave-shape such as to rise to crest-value in approximately 10 micro-seconds and to decay to one half of the crest-value in approximately 10 additional micro-seconds, where V is less than (200+50 M) in the range from 40-mesh to 100-mesh, and less than (4400+8 M) in the range from 100-mesh to 200-mesh.

9. A lightning-arrester valve-element comprising, as its basic material, M-mesh crystals disposed so as to have a large number of crystal-to-crystal point-contacts, where M is not less than 40 nor larger than 120, characterized by said crystals being crystals of silicon carbide having sufficient body-impurities to cause said crystals to have electric-discharge characteristics corresponding to a crest-voltage of V volts per inch when a cylindrical column of such crystals, loosely packed, under a total pressure of approximately 500 pounds, and with a cylinder-diameter of approximately 2¼ inches, is discharging a surge having a crest-magnitude of 1500 amperes and a wave-shape such as to rise to crest-value in approximately 10 micro-seconds and to decay to one half of the crest-value in approximately 10 additional micro-seconds, where V is less than (200+50 M).

10. A lightning-arrester value-element comprising, as its basic material, M-mesh crystals disposed so as to have a large number of crystal-to-crystal point-contacts, where M is not substantially less than 60 nor substantially larger than 100, characterized by said crystals being crystals of silicon carbide having sufficient body-impurities to cause said crystals to have electric-discharge characteristics corresponding to a crest-voltage of V volts per inch when a cylindrical column of such crystals, loosely packed, under a total pressure of approximately 500 pounds, and with a cylinder-diameter of approximately 2¼ inches, is discharging a surge having a crest-magnitude of 1500 amperes and a wave-shape such as to rise to crest-value in approximately 10 micro-seconds and to decay to one half of the crest-value in approximately 10 additional micro-seconds, where V is less than (200+50 M).

11. A lightning-arrester valve-element comprising, as its basic material, M-mesh crystals disposed so as to have a large number of crystal-to-crystal point-contacts, where M is not less than 40, characterized by said crystals being crystals of silicon carbide having body-impurities including a sufficient amount of aluminum to cause said crystals to have electric-discharge characteristics corresponding to a crest-voltage of V volts per inch when a cylindrical column of such crystals, loosely packed, under a total pressure of approximately 500 pounds, and with a cylinder-diameter of approximately 2¼ inches, is discharging a surge having a crest-magnitude of 1500 amperes and a wave-shape such as to rise to crest-value in approximately 10 micro-seconds and to decay to one half of the crest-value in approximately 10 additional micro-seconds, where V is less than (200+50 M) in the range from 40-mesh to 110-mesh, and less than 5700 volts when M is larger than 110.

12. A lightning-arrester valve-element comprising, as its basic material, M-mesh crystals disposed so as to have a large number of crystal-to-crystal point-contacts, where M is not less than 40 nor larger than 200, characterized by said crystals being crystals of silicon carbide having body-impurities including a sufficient amount of aluminum to cause said crystals to have electric-discharge characteristics corresponding to a crest-voltage of V volts per inch when a cylindrical column of such crystals, loosely packed, under a total pressure of approximately 500 pounds, and with a cylinder-diameter of approximately 2¼ inches, is discharging a surge having a crest-magnitude of 1500 amperes and a wave-shape such as to rise to crest-value in approximately 10 micro-seconds and to decay to one half of the crest-value in approximately 10 additional micro-seconds, where V is less than (200+50 M) in the range from 40-mesh to 100-mesh, and less than (4400+8 M) in the range from 100-mesh to 200-mesh.

13. A lightning-arrester valve-element comprising, as its basic material, M-mesh crystals disposed so as to have a large number of crystal-to-crystal point-contacts, where M is not less than 40 nor larger than 120, characterized by said crystals being crystals of silicon carbide having body-impurities including a sufficient amount of aluminum to cause said crystals to have electric-discharge characteristics corresponding to a crest-voltage of V volts per inch when a cylindrical column of such crystals, loosely packed, under a total pressure of approximately 500 pounds, and with a cylinder-diameter of approximately 2¼ inches, is discharging a surge having a crest-magnitude of 1500 amperes and a wave-shape such as to rise to crest-value in approximately 10 micro-seconds and to decay to one half of the crest-value in approximately 10 additional micro-seconds, where V is less than (200+50 M).

14. A lightning-arrester valve-element comprising, as its basic material, M-mesh crystals disposed so as to have a large number of crystal-to-crystal point-contacts, where M is not substantially less than 60 nor substantially larger than 100, characterized by said crystals being crystals of silicon carbide having body-impurities including a sufficient amount of aluminum to cause said crystals to have electric-discharge characteristics corresponding to a crest-voltage of V volts per inch when a cylindrical column of such crystals, loosely packed, under a total pressure of approximately 500 pounds, and with a cylinder-diameter of approximately 2¼ inches, is discharging a surge having a crest-magnitude of 1500 amperes and a wave-shape such as to rise to crest-value in approximately 10 micro-seconds and to decay to one half of the crest-value in approximately 10 additional micro-seconds, where V is less than (200+50 M).

FREDERICK B. JOHNSON.